United States Patent [19]

Walker

[11] Patent Number: 4,884,172
[45] Date of Patent: Nov. 28, 1989

[54] AUTOMOTIVE SAFETY DEVICE FOR SIDE LIGHTING

[76] Inventor: James W. Walker, 145 Turnsworth Ave., Redwood City, Calif. 94062

[21] Appl. No.: 297,028

[22] Filed: Jan. 17, 1989

[51] Int. Cl.⁴ .............................................. B60Q 1/00
[52] U.S. Cl. ...................................... 362/61; 362/347; 362/457
[58] Field of Search ................... 362/61, 83, 347, 457, 362/78, 81

[56] References Cited

U.S. PATENT DOCUMENTS

| | | | |
|---|---|---|---|
| 1,145,087 | 7/1915 | Shaw | 362/83 |
| 1,698,905 | 1/1929 | Beechlyn | 362/347 X |
| 2,553,187 | 5/1951 | Goolsby | 362/61 |
| 3,941,994 | 3/1976 | Petty et al. | 362/83 |
| 4,642,737 | 2/1987 | Meyers, Jr. | 362/61 |
| 4,802,069 | 1/1989 | Chandler | 362/61 X |

Primary Examiner—Ira S. Lazarus
Assistant Examiner—Peggy Neils
Attorney, Agent, or Firm—Flehr, Hohbach, Test, Albritton & Herbert

[57] ABSTRACT

An automotive safety device for reflecting light from a front headlight rearwardly along the sides of the vehicle is in the form of a detachable plastic reflective strip which has one end attached to the center of the headlight and offset therefrom and the other end wrapped around the side of the automobile and attached to a side panel. By adjustment of suction cups front and rear wheels can effectively be illuminated along with other portions of the side of the automobile. Auxiliary safety uses of the reflective strip are also possible. Because it is of thin, flexible material, it can be easily stored away.

5 Claims, 1 Drawing Sheet

AUTOMOTIVE SAFETY DEVICE FOR SIDE LIGHTING

The present invention is directed to an automotive safety device for side lighting and more particularly to a detachable device which reflects light from one of the headlights of an automobile for providing light along the side of the vehicle for tire changing and other safety uses.

BACKGROUND OF THE INVENTION

When changing an automobile tire at night or installing snow chains, portable stand-alone lanterns or flashlights are commonly used. Unfortunately these may be inadvertently left at home, used for other purposes and removed from the automobile, or rely on an uncertain storage battery.

U.S. Pat. No. 1,716,938 granted to Lee Barton Williams in 1929 does show a permanently built-in device on stand-alone headlights of an antique automobile which reflects light rays rearwardly along the sides of the vehicle. While perhaps illuminating the rear tire wells for tire changing, the main object of the device is to eliminate "any danger of the driver ditching the vehicle on passing the vehicle moving in the opposite direction" and reading "house numbers". There is no illumination of the front tire well of the automobile. And of course Williams is applicable only to modification of an antique stand-alone headlight and the concept could not be readily applied to modern day automobiles.

OBJECTS AND SUMMARY OF THE INVENTION

It is therefore a general object of the present invention to provide an improved apparatus for automotive safety along with a process therefor.

In accordance with the above object there is provided an automotive safety device for use with a vehicle having a front with peripheral headlights and a side surface with wheel wells. An elongated flexible strip with two ends and having a width substantially the same as the height dimension of the headlight is provided. Means are provided for removably attaching the strip to the vehicle, including first means for positioning one end of the strip opposite the headlight and offset therefrom and second means for removably attaching the other end of the strip to the side of the vehicle and offset therefrom. This provides a curved or wraparound strip which reflects light from the headlight rearwardly along the side of the vehicle to illuminate at least one of the wheel wells.

From a process point of view the invention includes the steps of providing the temporary attachment means and then locating the strip on the vehicle to provide a wraparound for effective reflection.

BRIEF DESCRIPTION OF PREFERRED EMBODIMENT

Figure 1:
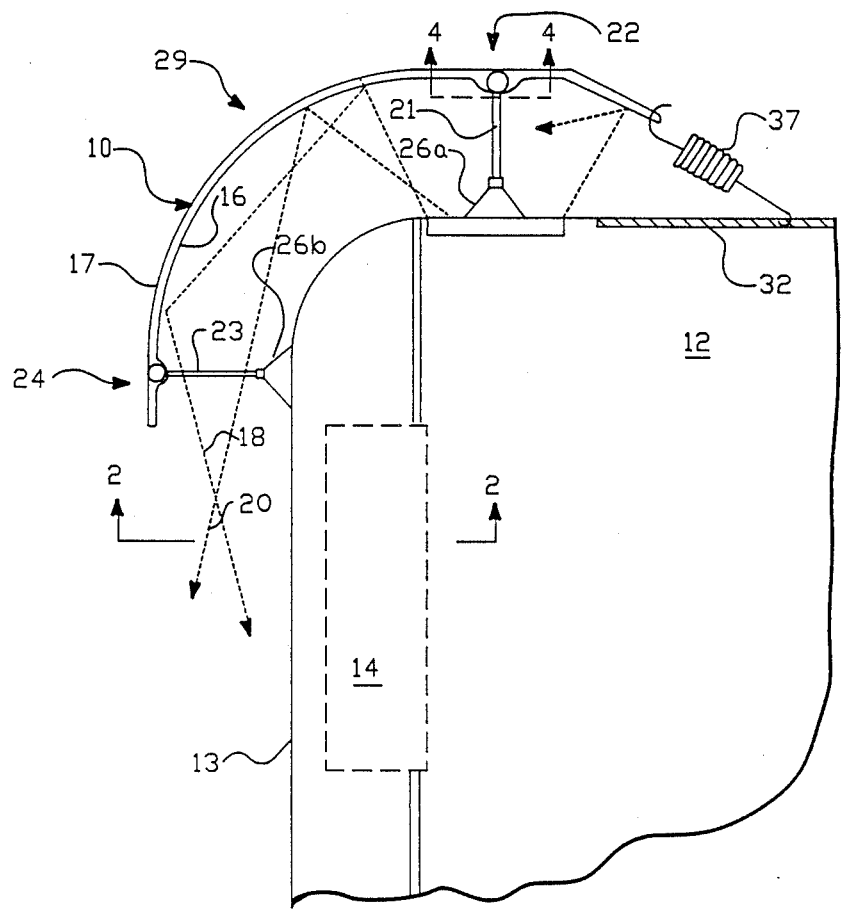
FIG. 1 is a top view of a portion of an automobile showing the invention removably attached thereto.

FIG. 1 illustrates an elongated flexible reflective strip 10 for reflecting light from a forward facing headlight 11 of a vehicle 12 back along the side 13 of the vehicle to provide sufficient light for emergency repairs, tire changes or other auxiliary uses. For example, a tire well 14 is shown containing a tire 14'.

At least the inner surface 16 of the strip 10 is reflective and, as illustrated by the beam paths, for example 17 and 18, reflects light from headlight 11 along the side 13 of automobile 12. The present invention of course has application to any type of vehicle with suitably mounted peripheral headlights 11.

Flexible strip 10, for example, may be constructed of a double layer with the outside layer 17 being of a fairly durable plastic and the inner layer 16, which is reflective, of material such as Mylar. Typical dimensions are 8 inches by 30 inches. The height dimension is thus substantially similar to that of a headlight 11 to provide for effective reflection.

For removably mounting the strip 10 to the automobile 12 a plastic tee 21 (see also FIG. 4) is provided for mounting one end 22 of the strip opposite and offset from headlight 11. And then a plastic double tee 23 (also see FIG. 2) provides for the mounting of the other end 24 of the strip 10 to the side panel or surface of the automobile 12. Each of the plastic tees 21 and 23 has affixed to the end of the plastic rod suction cups 26a through 26c which will effectively adhere either to the glass of the headlight or the painted metal side panel of the automobile. And the suction cups are suitable, of course, for removably or temporarily mounting the strip 10.

Figure 4:
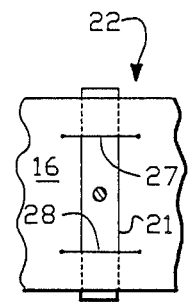
FIG. 4 is a cross-sectional view taken substantially along the line 4—4 of FIG. 1.

The plastic tees are affixed to the strip 10 by, for example as illustrated in FIG. 4, insertion of the ends of the rod 21 through slits 27 and 28. Similar slits although not shown at end 24 are provided for the double tee rod 23. Thus the plastic tees 21 and 23 are conveniently slipped through the opposing slits in both the end 22 and the end 24 of strip 10. Other techniques may also be used.

Figure 2:
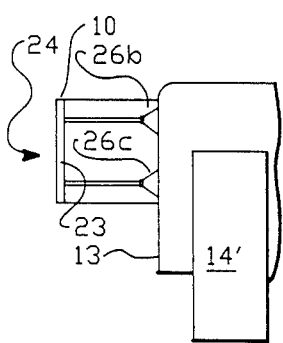
FIG. 2 is a cross-sectional view reduced in size substantially along the line 2—2 of FIG. 1.
Figure 3:
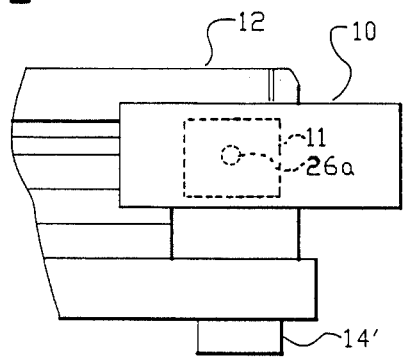
FIG. 3 is a front view of a portion of FIG. 1.

In the process of mounting the strip 10 the end 22 is normally mounted to the middle of headlight 11 by suction cup 26a. This provides, as illustrated in FIG. 3, suitable coverage of the headlight for effective reflection. Then to provide a wraparound 29 of the strip to the side of the automobile, and effective reflection as indicated by the light rays 18 and 20, end 24 is attached by suction cups 26b and 26c to a side panel or fender of the automobile. This is shown in FIG. 2 with the tire 14' being shown in the wheel well 14.

After mounting reflective strip 10, the headlights may be turned on and observation of the light rays 18 and 20 down the side of the vehicle made. To adjust the desired area of illumination, adjustment of end 24 may be made by repositioning suction cups 26b, 26c.

Because of the flexibility of strip 10, it can be easily stored away in the trunk of an automobile with the plastic tees 21 and 23 being folded and then the entire strip gently bent together.

In windy conditions or depending on the mounting a spring 37 (see FIG. 1) may also be attached between the end 22 of the strip and, for example, the grill 32 of the automobile.

The invention, in addition to its obvious use for tire changing or snow chain installation, can also be used as an emergency reflector, can have a sign attached for help from, for example, an automobile association, which may be attached to any point of the vehicle, can be used as a mirror, a ground mat, an auxiliary light for use in camping, a directional light beam source, or a heat source.

Thus an improved safety device for use with a vehicle in providing rearwardly reflected light along the side of the vehicle has been provided.

What is claimed is:

1. A process for use with a safety device for a vehicle, the vehicle having a front with peripheral headlights and wheel wells along side surfaces extending from the peripheral headlights where an elongated flexible reflective strip is used, comprising the following steps:

providing a said elongated flexible reflective strip with a length sufficient for one end of the strip to be located in front of a headlight and reflect light therefrom with the other end wrapping around the side of said vehicle;

on each end of the strip providing attachment means for temporarily attacing the strip to said vehicle but offset therefrom;

with the use of the attachment means, locating one end of the strip opposite a said headlight and the other end of the strip opposite said side of said vehicle to provide said wraparound and to reflect light from said headlight and by diverse light rays reflected by said wraparound to illuminate at least one of said wheel wells.

2. A process as in claim 1, including the step of adjusting the positioning of at least one of the ends of said strip on said vehicle to more effectively direct reflected light rearwardly to a desired location on the side of said vehicle.

3. In an automotive safety device for use with a vehicle having a front with peripheral headlights and a side surface with wheel wells, an elongated flexible reflective strip with two ends and having a width substantially the same as the height dimension of said headlight, means for removably attaching said strip to said vehicle, including first means for positioning one end of said sheet opposite a said headlight and offset therefrom and second means for removably attaching the other end of said strip to a side of said vehicle and offset therefrom for providing a curved sheet which reflects light from said headlight rearwardly by diverse light rays reflected by said curved sheet along the side of said vehicle to illuminate at least one of said wheel wells.

4. In a device as in claim 3 where said means for removably attaching includes suction cups.

5. In a device as in claim 4 including rod means with one end inserted into said suction cups and the other end attached to said strip for providing said offsets.

* * * * *